United States Patent [19]

Pollock et al.

[11] 4,440,664

[45] Apr. 3, 1984

[54] PROCESS FOR THE DISPERSION OF CHAIN EXTENDER IN POLYOL

[75] Inventors: Mark A. Pollock, Johnson City; Jimmie D. Fleenor, Gray, both of Tenn.

[73] Assignee: Eastman Kodak Company, Rochester, N.Y.

[21] Appl. No.: 438,543

[22] Filed: Nov. 1, 1982

[51] Int. Cl.$^3$ .......................... C09K 3/00; C08G 18/10
[52] U.S. Cl. ................................ 252/188.31; 521/177; 528/75
[58] Field of Search ................... 252/188.31, 182, 308; 521/177; 528/75

[56] References Cited

U.S. PATENT DOCUMENTS 3,791,984  2/1974  Brogli et al. ................... 252/308
3,909,445  9/1975  Ernst ............................. 252/308 X
4,374,970  2/1983  Robinson ........................ 528/79

Primary Examiner—Benjamin R. Padgett
Assistant Examiner—Virginia Caress
Attorney, Agent, or Firm—David E. Cotey; Daniel B. Reece, III

[57] ABSTRACT

The present invention provides a process for preparing stable, uniform dispersions of chain extenders in polyurethane-forming polyol. The preferred chain extender is hydroquinone di($\beta$-hydroxyethyl)ether. The process comprises an adiabatic quenching step in combination with an annealing step. The inventive process avoids the need for slow, carefully controlled cooling schemes.

8 Claims, No Drawings

PROCESS FOR THE DISPERSION OF CHAIN EXTENDER IN POLYOL

DESCRIPTION

Background

The present invention relates to a process for preparing dispersions of chain extender in polyurethane-forming polyol. More particularly, the process is directed to preparing dispersions of hydroquinone di($\beta$-hydroxyethyl)ether in polyurethane-forming polyol. Such dispersions are useful in the preparation of polyurethanes and are especially useful in the context of reaction injection molding techniques. The process is also advantageously used in conjunction with recently developed modified reaction injection molding (MIM) processes. These newly developed, quasi-one component processes require dispersions which are tailored for longer pot life.

Chain extenders, such as hydroquinone di($\beta$-hydroxyethyl)ether (HQEE), have found increasing utility in polyurethane-forming systems. These chain extenders are incorporated into the polyurethane-forming system in order to join together relatively low molecular weight polyurethane chains so as to form higher molecular weight polymer chains. In order to produce a useful end polymer having desirable properties, these chain extenders must be distributed uniformly throughout the polyurethane-forming system. This end can be accomplished by dispersing the chain extender in the polyol component of a two-component polyurethane-forming system (the other component being the isocyanate component).

Chain extender/polyol dispersions have been prepared in the past by agitating the chain extender/polyol mixture at temperatures higher than the melting point of the chain extender. The mixture was then cooled to room temperature to give the final dispersion. This method suffered from the high dependence of final product viscosity on the cooling rate of the mixture. Rapid cooling and/or cooling without proper agitation resulted in product solidification. Thus, the material tended to solidify during the cooling step on heat transfer surfaces such as the vessel walls. Little or no control was available over the final product viscosity.

Other methods for preparing chain extender/polyol dispersions have involved dispersing ground chain extender in a polyol at room temperature. This method was not suitable because of the cost of grinding the chain extender. There also were indications that the final polyurethane product was inferior to that obtained when prior melt phase processes were used in preparing chain extender/polyol dispersions.

It has further been disclosed in a 1980 Research Disclosure (No. 19,540) that dispersions of chain extender in polyol can be obtained by heating a mixture of chain extender and polyol to a temperature above the melting point of the chain extender and then cooling the mixture at a controlled rate to room temperature. The cooling rate is selected so that the solution does not freeze into a nonequilibrated, glassy state. Following cooling, the viscosity of the product can be adjusted as desired by the addition of additional polyol.

The processes described above all suffer the disadvantage of requiring an extremely slow cooling step (i.e., on the order of 8-24 hours). Attempts to speed the cooling step result in excessive crystal growth on heat transfer surfaces and/or a solid, non-equilibrated, glassy product. The present invention overcomes these disadvantages by providing a process wherein dispersions are rapidly prepared without the need for a prolonged cooling step and the final dispersions properties are easily controlled.

SUMMARY OF THE INVENTION

The present invention provides a process for preparing dispersions of hydroquinone di($\beta$-hydroxyethyl)ether in polyurethane-forming polyol. The process comprises steps of:

(a) heating and blending an initial mixture of about 5 to 30 parts by weight of HQEE and about 10 to 50 parts by weight of the polyol until a condensed phase is formed by the melting of HQEE at a temperature of at least about 90° C.;

(b) combining with the initial mixture an additional quantity of polyol sufficient to bring the total amount of polyol in the resulting dispersion to about 100 parts by weight, the additional polyol being at a temperature substantially below that of the initial mixture so that the addition thereof to the initial mixture results in adiabatic quenching of the resulting dispersion to a temperature in the range of about 70° to 85° C.;

(c) annealing the dispersion by heating the dispersion to a temperature which is at least about 5° C. greater than the quenching temperature and which is in the range of about 84° to 90° C.; and (d) cooling the dispersion to a desired handling temperature which is less than about 60° C.

DETAILED DESCRIPTION OF THE INVENTION

The present invention relates to a process for preparing dispersions of polyurethane chain extenders in polyurethane-forming polyol. While it is contemplated that a number of currently available chain extenders may be used in the process of the present invention, the process is directed particularly toward the use of hydroquinone di($\beta$-hydroxyethyl)ether (HQEE).

The polyol in which the chain extender is to be dispersed can be any of the well known, commercially available polyurethane-forming polyol formulations. Such polyols have been described at length in the literature. See, for example, Polyurethanes: Chemistry and Technology, Part 1. Chemistry, by J. H. Saunders and K. C. Frisch, Interscience Publishers (New York: 1962), pages 32–46, and Polyurethane Technology, ed. Paul F. Bruins, Interscience Publishers (New York: 1969), pages 12–19. The best known and most widely used type of polyurethane-forming polyol are the polyether polyols. Examples of such polyols are the poly(oxypropylene)glycols; the poly(oxypropylene)-poly(oxyethylene)glycols; and the poly(oxypropylene) adducts of glycerine, trimethylol propane, 1,2,6-hexanetriol, pentaeythritol, and sorbitol. Such polyols are available commercially under the trademarks Niax ® (Union Carbide), Pluracol ® and Tetronic ® (Wyandotte Chemicals), Voranol ® (Dow chemical), Poly-G ® (Olin Chemicals), Triol G ® (Jefferson Chemical), and Actol ® (Allied Chemical). Specific commercial polyols which are preferred for use in the process of the present invention include Pluranol ® P-581 and Niax ® D-440. However, it is to be understood that the process of the present invention is not limited to the use of these preferred polyols.

The process of the present invention provides dispersions comprising 5 to 30 parts by weight of hydroquinone di(β-hydroxyethyl)ether and about 100 parts by weight of polyol. Especially preferred dispersions comprise about 20 parts by weight of HQEE and about 100 parts by weight of polyol.

In accordance with the process of the present invention, an initial mixture of about 5 to 30 parts by weight of HQEE (preferably about 20 parts by weight) and about 10 to 50 parts by weight of polyol is heated and blended until a condensed phase is formed by the melting of HQEE. The term "blended" as used herein is intended to connote mixing in conjunction with agitation. Any of a number of well-known agitation systems can be used in this regard. Thus, means for accomplishing agitation can include static mixers, dynamic mixers, pumps, heat exchange equipment, shear devices, screens, homogenizers, and other apparatus which accomplishes the desired objectives of mixing in conjunction with agitating.

In preferred embodiments, the initial mixture comprises about half of the total amount of polyol to be included in the final dispersion (i.e., about 40-50 parts by weight).

Typically, the initial mixture is heated to a temperature of at least about 90° C. in order to form a condensed phase by the melting of the HQEE. Preferably, the mixture is heated to a temperature within the range of about 90°-105° C.

After the initial mixture has been heated to a desired temperature at which a condensed phase is observed, an additional quantity of polyol is combined with the initial mixture. The additional quantity of polyol required is that which is sufficient to bring the total amount of polyol in the resulting dispersion to about 100 parts by weight. The temperature of the additional polyol is substantially below that of the heated initial mixture so that the addition of the additional polyol results in adiabatic quenching of the resulting dispersion. In especially preferred embodiments, the additional polyol is at room temperature before being added to the initial mixture. However, it is contemplated that it may be necessary and/or desirable for the additional polyol to be at a temperature below room temperature in order to accomplish adiabatic quenching of the resulting dispersion. It is also conceivable that the additional polyol could be at a temperature above room temperature upon its addition to the initial mixture. However, the extra heating required to obtain a temperature above room temperature would in most instances be wasteful; the same results could be achieved by varying the amount of polyol utilized in the initial mixture relative to the amount of room temperature polyol utilized in the subsequent quenching.

The additional polyol is combined with the initial mixture so as to achieve adiabatic quenching of the resulting dispersion to a temperature in the range of about 70° to 85° C. By the term "adiabatic quenching", it is meant that there is no transfer of heat energy to or from the dispersion system other than between the initial mixture and the additional polyol. The amount of additional polyol and the temperature at which it is combined with the initial mixture are adjusted so that the temperature of the resulting dispersion is within the range of 70° to 85° C.

The resulting dispersion is then annealed by heating the dispersion to a temperature which is at least about 5° C. greater than the quenching temperature and which is in the range of about 84° to 90° C. During this annealing step, the dispersion is gently heated and agitated. As discussed above, the agitation can be accomplished using a wide variety of apparatus. After annealing, the dispersion is then cooled to a desired handling temperature which is less than about 60° C. Typically, the desired handling temperature will be less than 50° C. and preferably about 40° C.

While not wishing to be bound by theoretical considerations, it appears that the advantages realized by the process of the present invention are due to transformations which occur in the crystalline content of the material. For example, in prior processes, slow cooling without agitation yielded a hard matrix of crystals having varying compositions. In contrast, in accordance with the process of the present invention, rapid quenching by the addition of polyol yields a large number of smaller crystallites having nearly the same composition. Subsequent reheating (annealing) accomplishes the transformation of some of these crystallites to a softer, poly-rich phase. That is, the crystallites are diminished in size and/or number, and the result is a smoother, more stable, and more uniform dispersion.

It has further been observed that the properties of the final dispersion are strongly dependent upon the exact temperature-transformation-time sequence which is followed and upon the shear inputs. In other words, varying the quenching rate, the extent of quenching, and/or the agitation rate influences the types and sizes of the suspended phases. For example, in order to achieve a final dispersion with a relatively low viscosity, the adiabatic quenching should be accomplished relatively quickly. Conversely, If a higher viscosity is desired, the additional polyol should be added more slowly for a decreased quenching rate. Therefore, by adjusting the various parameters within the limits defined by the process of the present invention, the skilled artisan can optimize the present process for any particular HQEE/polyol dispersion system.

It has also been observed that dispersions which have been previously prepared, either by the present process or by some less advantageous prior art process, can be upgraded in quality by subjecting the previously-formed dispersion to the annealing procedure of the present process. That is, a lower quality dispersion comprising about 5 to 30 parts by weight of HQEE and about 100 parts by weight of polyol can be upgraded by heating the dispersion to a temperature in the range of about 70° to 85° C., annealing the dispersion by further gently heating the dispersion with agitation at least an additional 5° C. to a temperature which is in the range of about 84° to 90° C., and then cooling the dispersion again to the desired handling temperature. In this manner, the properties of the lower quality dispersion are improved, presumably by transformation of the crystallites which may be present in the dispersion, as described above.

In contrast to prior processes for forming HQEE/polyol dispersions, the process of the present invention avoids the necessity of slow, expensive, time-consuming cooling steps. Rapid adiabatic quenching is accomplished by the addition of a portion of one of the components of the system (i.e., the polyol component), and, after annealing, the resulting dispersion can be cooled to a desired processing temperature without regard to any slow, critical cooling schedule. Thus, according to the process of the present invention, dispersions can be rapidly prepared, and operating costs are reduced. In addition, final dispersion properties can be controlled for specific applications by adjusting the extent and rate of quenching. In addition, poor quality dispersions can easily be upgraded.

This invention will be further illustrated by the following examples, although it will be understood that these examples are included merely for purposes of illustration and are not intended to limit the scope of the invention.

EXAMPLE 1

This example illustrates the preparation of a 20:100 HQEE:polyol dispersion. The polyol which is used in the present example is Niax ® D-440, which is a graft copolymer of polytetramethylene glycol with acrylonitrile and styrene and which exhibits an average molecular weight of about 4066.

Twenty parts by weight of HQEE and 50 parts by weight of the polyol are heated and agitated in a stirred vessel until the HQEE is fully melted at about 100° C. An additional 50 parts of polyol is added at room temperature to this initial mixture. The mixture is thereby adiabatically quenched to about 78° C. The resulting dispersion is then gently heated with continued agitation to a temperature of about 84° C. During this annealing step, a decrease in viscosity is observed. The dispersion is then passed through a gear pump into a $\frac{3}{8}''\times 15'$ jacketed tube coil. Cooling water is passed through the jacket, thereby cooling the dispersion flowing through the interior of the coil to a desired product temperature of about 40° C. The cooled dispersion exits the coil through a relief valve, which functions as a homogenizer.

The resulting product is observed to be a readily flowable, uniform dispersion of HQEE and polyol.

The invention has been described in detail with particular reference to preferred embodiments thereof, but it will be understood that variations and modifications can be effected within the spirit and scope of the invention.

We claim:

1. A process for preparing dispersions of hydroquinone di($\beta$-hydroxyethyl)ether in polyurethane-forming polyol comprising the steps of:
    (a) heating and blending an initial mixture of about 5 to 30 parts by weight of said ether and about 10 to 50 parts by weight of said polyol until a condensed phase is formed by the melting of said ether at a temperature of at least about 90° C.;
    (b) combining with said initial mixture an additional quantity of polyol sufficient to bring the total amount of polyol in the resulting dispersion to about 100 parts by weight, the additional polyol being at a temperature substantially below that of said initial mixture so that the addition thereof to said initial mixture results in adiabatic quenching of the resulting dispersion to a temperature in the range of about 70° to 85° C.;
    (c) annealing said dispersion by heating said dispersion to a temperature which is at least about 5° C. greater than the quenching temperature and which is in the range of about 84° to 90° C.; and
    (d) cooling said dispersion to a desired handling temperature which is less than about 60° C.

2. The process of claim 1 wherein said dispersion comprises about 20 parts by weight of said ether.

3. The process of claim 1 wherein said initial mixture is heated to a temperature of about 90° to 105° C. until a condensed phase is formed.

4. The process of claim 1 wherein said initial mixture comprises about 5 to 30 parts by weight of said ether and about 40 to 50 parts by weight of said polyol.

5. The process of claim 1 wherein said dispersion after annealing is cooled to a temperature less than about 50° C.

6. A process for preparing dispersions of hydroquinone di($\beta$-hydroxyethyl)ether in polyurethane-forming polyol comprising the steps of:
    (a) heating and blending an initial mixture of about 5 to 30 parts by weight of said ether and about 40 to 50 parts by weight of said polyol until a condensed phase is formed by the melting of said ether at a temperature of about 90° to 105° C.;
    (b) combining with said initial mixture an additional quantity of polyol sufficient to bring the total amount of polyol in the resulting dispersion to about 100 parts by weight, the additional polyol being at a temperature substantially below that of said initial mixture so that the addition thereof to said initial mixture results in adiabatic quenching of the resulting dispersion to a temperature in the range of about 70° to 85° C.;
    (c) annealing said dispersion by heating said dispersion to a temperature which is at least about 5° C. greater than the quenching temperature and which is in the range of about 84° to 90° C.; and
    (d) cooling said dispersion to a desired handling temperature which is less than about 50° C.

7. The process of claim 6 wherein said dispersion comprises about 20 parts by weight of said ether.

8. The process of claim 6 wherein said handling temperature is about 40° C.

* * * * *